United States Patent [19]

Takeuchi et al.

[11] Patent Number: 4,508,104
[45] Date of Patent: Apr. 2, 1985

[54] RETAINING DEVICE FOR AN INNER TUBE OF AN EVACUATED DOUBLE-TUBING TYPE SOLAR HEAT COLLECTOR

[75] Inventors: Hirosato Takeuchi; Toshio Mikiya, both of Tokyo, Japan

[73] Assignee: Nitto Kohki Co., Ltd., Tokyo, Japan

[21] Appl. No.: 422,142

[22] Filed: Sep. 23, 1982

[51] Int. Cl.³ .................................................. F24J 3/02
[52] U.S. Cl. .................................... 126/443; 126/417; 126/442
[58] Field of Search ............... 126/442, 443, 417, 448; 138/113, 114, 148, 108

[56] References Cited

U.S. PATENT DOCUMENTS

| | | | |
|---|---|---|---|
| 3,528,456 | 9/1970 | Scheffler | 138/113 |
| 4,067,315 | 1/1978 | Fehlner et al. | 126/443 X |
| 4,122,831 | 10/1978 | Mahdjuri | 126/446 X |
| 4,124,019 | 11/1978 | Heffelfinger | 138/113 X |
| 4,134,388 | 1/1979 | Kersten et al. | 126/448 X |
| 4,250,927 | 2/1981 | Newburg | 138/113 |
| 4,282,857 | 8/1981 | Pei | 126/422 |
| 4,308,857 | 1/1982 | Sims | 126/443 |

Primary Examiner—Larry Jones
Attorney, Agent, or Firm—Birch, Stewart, Kolasch & Birch

[57] ABSTRACT

A retaining device for an inner tube of an evacuated double-tubing type solar heat collector having a ring formed around an outer periphery surface of an inner tube and at least three equally spaced-apart leaf springs being affixed to the ring at right angles to the diametric direction thereof. Each leaf spring is constructed from a narrow metal strip bent into a corrugated or gentle saw-tooth shape. The leaf springs having portions for contacting an inner surface of an outer tube formed at bent crest portions, and portions for contacting the outer surface of the inner tube formed at bent trough portions. The leaf springs are bent centripetally inward at one end thereof and formed into respective holders of a getter metal at the inwardly bent portions.

3 Claims, 4 Drawing Figures

4,508,104

RETAINING DEVICE FOR AN INNER TUBE OF AN EVACUATED DOUBLE-TUBING TYPE SOLAR HEAT COLLECTOR

BACKGROUND OF THE INVENTION

An evacuated double-tubing type solar heat collector, which is known in the art, includes an outer tube and an inner tube having a so-called selective absorption film disposed on its outer surface. The inner tube is inserted within the outer tube and the space between the tubes is hermetically sealed and evacuated to a reduced pressure. Since it is difficult to retain the inner tube within the outer tube in a stable manner, the conventional solar heat collector is prone to strain and breakage if subjected to the slightest impact.

One example of the solar heat collector of the aforementioned type has a coil spring for applying an elastic force in the direction of thrust. The coil spring is disposed in the space between the tubes at the base end of the collector. However, it is difficult to maintain coincidence between the central axes of the inner and outer tubes at all times, more specifically, it is difficult to keep the inner tube centered in the outer tube. Even the slightest deflection or off-centering of the inner tube at its base end will give rise to strain within the glass which will in turn cause breakage of the portion where the opening between the tubes is fused closed to provide the hermetic seal.

In another example of a conventional collector tube, the outer tube is provided at a point near its base end with a dimple projecting radially inwardly toward the center of the tube for the purpose of retaining the inner tube by contacting its outer surface at a point near the base end of the tube. The major difficulty with this arrangement is that a gap can form between the dimple and the inner tube. Even a very small gap will permit the inner tube to deflect and strike the dimple, giving rise to a rattling noise. If the gap is large the inner tube will be free to deflect to a greater extent and will result in the type of breakage mentioned above.

In view of the foregoing problems, some solar heat collectors have a gently tapered volute spring fit over the outer periphery of the inner tube. Although such a spring makes it possible to center the inner tube, deflection of the inner tube cannot be prevented because of the elasticity of the spring. Another disadvantage is that the spring slides along the central axis of the inner tube when the inner tube is inserted. Thus, it is inevitable that a projection, such as the above-mentioned dimple, is used in combination with this arrangement.

The present invention has been devised in view of the foregoing shortcomings encountered in the conventional inner tube retaining devices and has as its object to provide an evacuated double-tubing type solar heat exchanger that completely eliminates these shortcomings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 4:
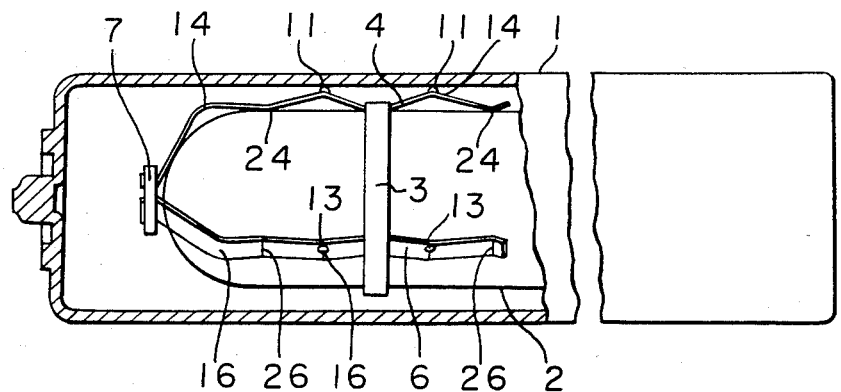
FIG. 4 is a side view illustrating a solar heat collector embodying the present invention.

As illustrated in FIG. 4, the solar heat exchanger includes an outer tube 1, an inner tube 2 and a ring 3. The ring 3 is constructed of a narrow metal strip which is positioned in the outer periphery of the inner tube 2. The ring 3 is so formed to have approximately the same diameter as the outer diameter of the inner tube 2.

As illustrated in FIGS. 1–4, leaf springs 4, 5 and 6 are provided which are each constructed as a narrow metal strip bent into a corrugated or gentle saw-tooth configuration. The crest portions 14, 15, 16 of the bent strips 4, 5, 6 define surfaces for contacting the inner wall of the outer tube 1, while the trough portions 24, 25, 26 define surfaces for contacting the outer wall of the inner tube 2. The three leaf springs 4, 5 and 6 are equally spaced from one another and spot-welded to the ring 3 so as to lie at right angles to the diameter of the inner tube.

Figure 1:
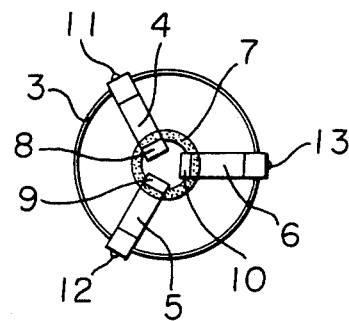
FIG. 1 is a front view of the device according to the present invention.
Figure 2:
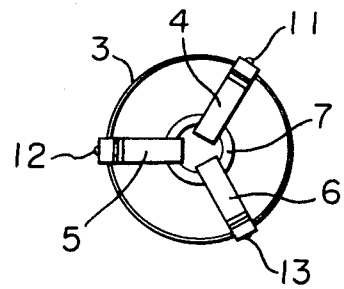
FIG. 2 is a back view of the device illustrated in FIG. 1.
Figure 3:
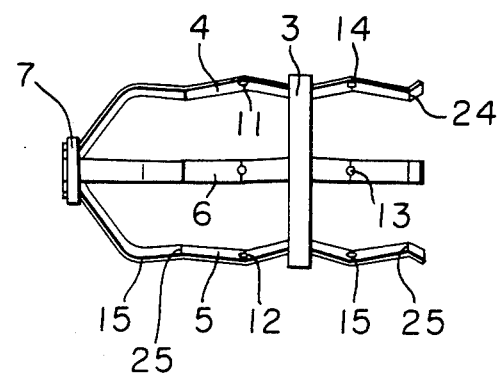
FIG. 3 is a right-side view of the device.

As shown in FIGS. 1 through 3, each of the leaf springs 4, 5, 6 has one end bent centripetally inward, each of these ends then being bent centrifugally outward to form a C-shaped portion. These portions define respective C-shaped holders 8, 9, 10 for supporting the grommet-shaped casing 7 of a getter metal, namely, a metal which adsorbs residual gases. Hereinafter the combination of the getter metal and casing will be referred to as a getter metal.

The crest portions 14, 15, 16 of the respective leaf springs 4, 5, 6 are formed, by means of a center punch or the like, into rounded, point-like projections extending radially outwards of the tubes. Due to the point-like projections 11, 12, 13, the crest portions 14, 15, 16 come into point contact, rather than linear contact, with the inner surface of the outer tube, thereby readily allowing the leaf springs 4, 5, 6 to slide on the inner portion of the outer tube. In other words, the leaf springs slide easily on the inner surface of the outer tube when the inner tube is inserted, thereby precluding scratching of said surface.

The inner tube 2 is retained by the device of the present invention in the following manner. The grommet-shaped getter metal 7 is engaged beforehand with the three holders 8, 9, 10 that oppose the central axis of the collector from three directions. The getter metal 7 is thus supported at the end of the retaining device which is then fit on the outer periphery of the inner tube 2 at the base portion thereof.

Since the leaf springs 4, 5, 6 are affixed to the ring 3 as described above, fitting the retaining device on the outer periphery of the inner tube at its base portion in the aforementioned manner fixes the bent trough portions 24, 25, 26 of the leaf springs 4, 5, 6 uniformly against the outer surface of the inner tube. As a result, a centrifugally directed elastic force is produced at the ends where the leaf springs are bent inwardly toward the center of the inner tube, whereby the holders 8, 9, 10 formed at said respective ends strongly retain the getter metal 7 by means of the elastic force.

Thus, when the inner tube 2 fitted with the retaining device is inserted into the outer tube 1 from the open end thereof, the point-like projections 11, 12, 13, formed on the bent crest portions 14, 15, 16 of the leaf springs 4, 5, 6 constituting the retaining device, come into uniform contact with the inner surface of the outer tube 1 so that the inner tube 2 is retained in line with the central axis of the outer tube.

In accordance with the present invention as described and illustrated hereinabove, the ring 3 is formed around the outer periphery of the inner tube 2. At least three equally spaced-apart leaf springs 4, 5, 6 are affixed to the ring 3 at right angles to the diametric direction. Each leaf spring is constructed from a narrow metal strip bent into a corrugated or gentle saw-tooth shape. The leaf springs include portions for contacting the inner surface of the outer tube formed at bent crest portions 14, 15, 16, and portions for contacting the outer surface of the inner tube formed at bent trough portions 24, 25, 26. The leaf springs 4, 5, 6 are bent centripetally inward at one end thereof and formed into respective holders 8, 9, 10 of a getter metal 7 at the inwardly bent portions.

Accordingly, when the inner tube 2 is inserted into the outer tube 1 with the inventive retaining device of the aforementioned construction interposed between the tubes, the leaf springs 4, 5, 6 embrace the inner tube at the base end thereof and retain the inner tube uniformly in the radial direction at each of the portions of contact, thereby readily centering the inner tube 2. In other words, the size of the clearance between the outer tube 1 and inner tube 2 in the radial direction is readily uniformalized at the locations of the leaf springs. Due to the intervention of the leaf springs 4, 5, 6, moreover, the springs completely absorb deflection of and strain in the inner tube 2 and offer a strong buffering force against impact, thereby precluding breakage of the connection between the outer and inner tubes 1, 2.

Since the retaining device of the invention includes the leaf springs 4, 5, 6 which are bent to form the holders 8, 9, 10 of the getter metal 7, the retaining device will not slide on the inner tube 2 when the inner tube is inserted. Moreover, the invention performs the functions of both the inner tube retainer and the getter metal holder, unlike the conventional arrangement in which the retainer for the inner tube and the holder for the getter metal are formed separately. It is therefore unnecessary to undertake special machining or processing, such as forming a dimple in the outer tube, so that the invention offers economical advantages as well. The end result is a much lower cost for manufacturing a solar heat collector.

Furthermore, since the getter metal holders 8, 9, 10 are constituted by leaf springs, they can be spread centrifugally outward against their elastic force when not holding the getter metal 7. This allows the retaining device of the invention to be fit on the central portion of the inner tube 2, rather than on its base portion, to absorb flexure of the inner tube in a simple manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A retaining device for an inner tube of an evacuated double-tubing type solar heat collector comprising:
    a ring having an inner diameter approximately equal to the outer diameter of the inner tube and adapted to be positioned around the outer periphery of the inner tube; and
    at least three leaf springs extending generally longitudinally of the inner and outer tubes of the collector and circumferentially equally spaced apart from each other, each of the leaf springs being made of a narrow metal strip bent into a corrugated or gentle sawtooth shape and having first portions for contacting the inner surface of the outer tube formed at the bent crest portions and second portions for contacting the outer surface of the inner tube formed at the bent trough portions, each of the leaf springs being fixed adjacent one of its trough portions to said ring at right angles relative to the diameter of the ring, and said leaf springs being bent adjacent one end inwardly toward the center of the inner tube and convergingly toward each other and being formed at said one end with hooked portions which cooperate to define a holder for an annular ring of getter metal.

2. A retaining device according to claim 1, wherein said portions of said leaf springs for contacting an inner surface of said outer tube are point-like projections easily slidable on the inner surface of the outer tube when the inner tube is inserted.

3. A retaining device according to claim 1, wherein said leaf springs are welded to said ring.

* * * * *